(12) United States Patent
Takada et al.

(10) Patent No.: US 12,420,349 B2
(45) Date of Patent: Sep. 23, 2025

(54) ARC WELDING CONTROL METHOD

(71) Applicant: DAIHEN Corporation, Osaka (JP)

(72) Inventors: Kento Takada, Osaka (JP); Tetsuo Era, Osaka (JP); Satoshi Arakane, Osaka (JP)

(73) Assignee: DAIHEN Corporation, Osaka (JP)

( * ) Notice: Subject to any disclaimer, the term of this patent is extended or adjusted under 35 U.S.C. 154(b) by 817 days.

(21) Appl. No.: 16/701,584

(22) Filed: Dec. 3, 2019

(65) Prior Publication Data

US 2020/0198043 A1    Jun. 25, 2020

(30) Foreign Application Priority Data

Dec. 21, 2018  (JP) .................................. 2018-239497
Mar. 25, 2019  (JP) .................................. 2019-056411

(51) Int. Cl.
*B23K 9/095*    (2006.01)
*B23K 9/12*     (2006.01)

(52) U.S. Cl.
CPC ............ *B23K 9/0953* (2013.01); *B23K 9/125* (2013.01)

(58) Field of Classification Search
CPC ........ B23K 9/09; B23K 9/095; B23K 9/0953; B23K 9/1093; B23K 9/125; B23K 9/124; B23K 9/0956; B23K 9/133; B23K 9/1336; B23K 9/1333; B23K 9/12; B23K 9/073
USPC ................... 219/137 R, 137.2, 137.7–137.71
See application file for complete search history.

(56) References Cited

U.S. PATENT DOCUMENTS 6,515,259 B1      2/2003  Hsu et al.
6,831,251 B1 *   12/2004  Artelsmair ........... B23K 9/1336
                                                      219/137.71
8,124,913 B2      2/2012  Artelsmair
8,513,568 B2      8/2013  Kawamoto et al.
(Continued)

FOREIGN PATENT DOCUMENTS

EP      3 357 624 A1     8/2018
JP     2005-313179 A    11/2005
(Continued)

OTHER PUBLICATIONS

English translation to JP201794380 (Year: 2017).*
Search Report received in the corresponding European Patent application, Jul. 1, 2020 (6 pages).

*Primary Examiner* — Sang Y Paik
*Assistant Examiner* — Bonita Khlok
(74) *Attorney, Agent, or Firm* — HSML P.C.

(57) ABSTRACT

A control method is provided for arc welding performed by repeating a short-circuit period and an arc period. The method includes: feeding a welding wire by a push-pull feeding control using a push-side feeding motor configured to rotate in a forward direction and a pull-side feeding motor configured to rotate in a forward direction and a reverse direction; temporarily storing a portion of the welding wire in an intermediate wire receptacle disposed along a feeding path between the push-side feeding motor and the pull-side feeding motor; and correcting a pull feeding speed of the pull-side feeding motor based on a store amount of the welding wire in the intermediate wire receptacle. The correction of the pull feeding speed is performed by correcting a waveform parameter for the pull feeding speed based on the store amount in the intermediate wire receptacle.

10 Claims, 4 Drawing Sheets

(56) References Cited

U.S. PATENT DOCUMENTS

Figure 1:
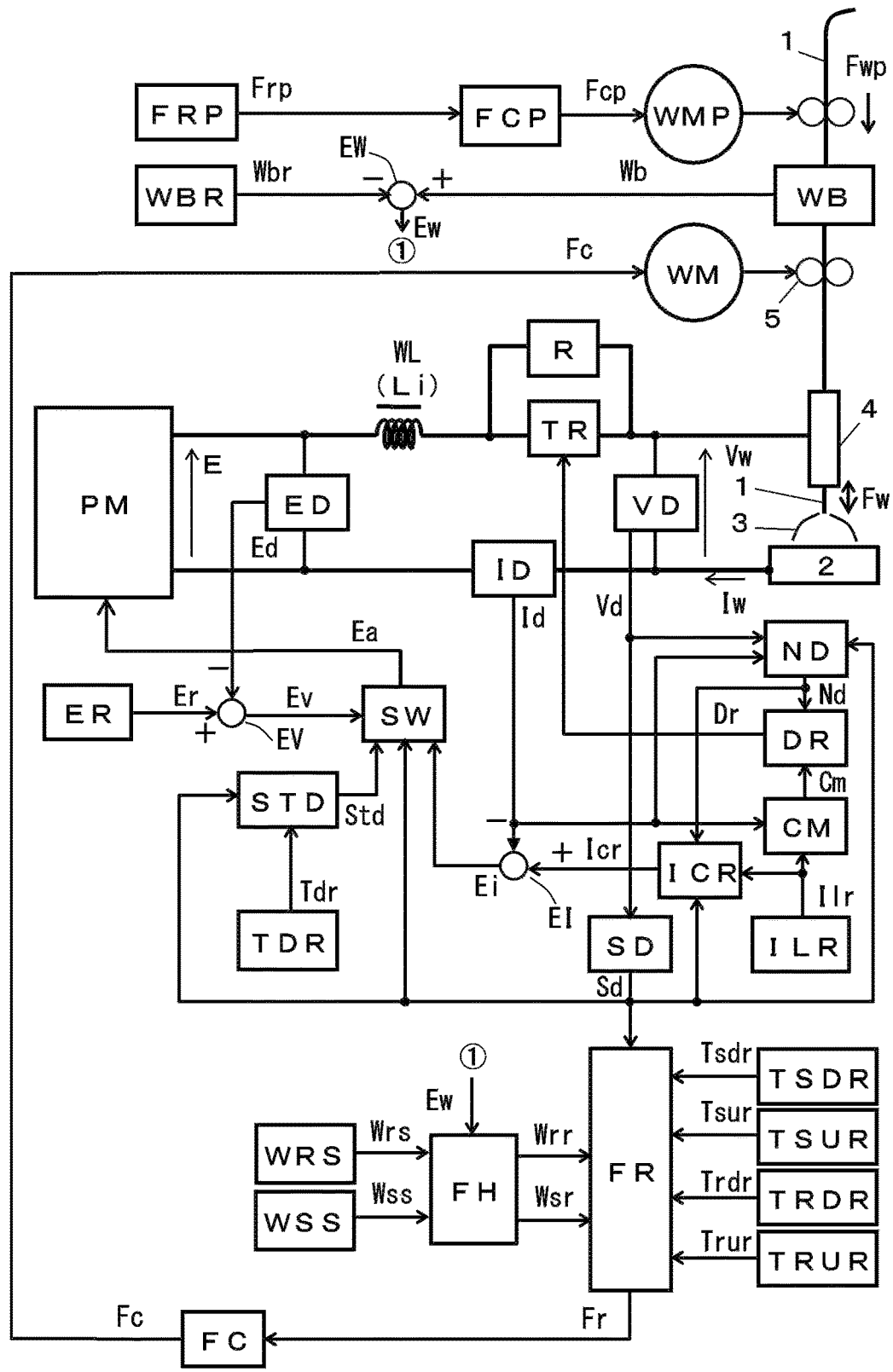

| | | |
|---|---|---|
| 8,720,802 B2 | 5/2014 | Kerst et al. |
| 8,723,080 B2 | 5/2014 | Kawamoto et al. |
| 9,550,248 B2 | 1/2017 | Hearn et al. |
| 2002/0153363 A1 | 10/2002 | Hiraoka et al. |
| 2004/0016788 A1 | 1/2004 | Huismann et al. |
| 2007/0056944 A1 | 3/2007 | Artelsmair |
| 2014/0263241 A1 | 9/2014 | Henry et al. |
| 2017/0252850 A1 | 9/2017 | Ide |
| 2018/0099346 A1 | 4/2018 | Zwayer et al. |
| 2018/0354051 A1 | 12/2018 | Uecker et al. |
| 2021/0060792 A1 | 3/2021 | Yoshida |
| 2021/0094114 A1 | 4/2021 | Takada |

FOREIGN PATENT DOCUMENTS

| | | | |
|---|---|---|---|
| JP | 2015-205347 A | | 11/2015 |
| JP | 2017-94380 A | | 6/2017 |
| JP | 201794380 | * | 6/2017 |
| JP | 2018-51579 A | | 4/2018 |

\* cited by examiner

ARC WELDING CONTROL METHOD

FIELD

The present disclosure relates to an arc welding control method in which a welding wire is fed through push-pull feeding control using a push-side feeding motor for forward rotation and a pull-side feeding motor for forward and reverse rotations.

BACKGROUND

Generally, in consumable-electrode arc welding, welding is performed by feeding a welding wire (consumable electrode) at a constant speed and generating an arc between the welding wire and a base material. The welding state of the consumable-electrode arc welding often undergoes a short-circuit period and an arc period alternately.

In order to further improve the welding quality, a forward/reverse feeding arc welding method is proposed in which a welding wire is fed in a forward direction and a reverse direction alternately. This arc welding method can stabilize the repetition cycle of short-circuiting and arcing as compared to the conventional method in which the feeding speed is constant, thus improving the welding quality due to a reduction in spatter generation and an improvement in bead appearance.

In the forward/reverse feeding arc welding method, the direction of feeding the welding wire needs to be switched between a forward direction and a reverse direction accurately with a frequency of approximately 100 Hz. For this reason, a push-pull feeding method is often employed for feeding the wire. Furthermore, it is often the case that an intermediate wire receptacle is provided in the feeding path between the push-side feeding motor and the pull-side feeding motor to temporarily store the welding wire.

In the forward/reverse feeding arc welding method, switching between the forward feeding period and the reverse feeding period is performed in synchronization with the timing at which the short-circuit period or the arc period occurs. Accordingly, if welding conditions, such as a welding voltage set value and a wire extension length, change, and hence the time ratio between the short-circuit period and the arc period changes, then the time ratio between the forward feeding period and the reverse feeding period also changes. This causes a change in the average feeding speed of the welding wire. When the average feeding speed changes, the amount of deposition also changes to cause deterioration in the welding quality. In order to address this issue, JP-A-2017-94380 discloses a technique of feeding a welding wire in a forward direction with a push-side motor at a constant speed, detecting the amount of the welding wire stored in an intermediate wire receptacle, and correcting/controlling the pull feeding speed of a pull-side motor based on the detected store amount. The correction and control described above can suppress changes in the average feeding speed.

In the conventional correction control described above, the average value of the pull feeding speed is changed based on the store amount in the intermediate wire receptacle. Accordingly, if the welding conditions such as the welding voltage set value and the wire extension length abruptly change, the welding quality may deteriorate due to the poor transient responsiveness in the correction control.

In view of the above drawback, an object of the present disclosure is to provide a forward/reverse feeding arc welding control method that corrects and controls the pull feeding speed based on the store amount in the intermediate wire receptacle, and that performs the correction control at high speed and with high accuracy.

SUMMARY

In accordance with an aspect of the present disclosure, there is provided a control method for arc welding performed by repeating a short-circuit period and an arc period. The method may include: feeding a welding wire by a push-pull feeding control using a push-side feeding motor configured to rotate in a forward direction and a pull-side feeding motor configured to rotate in a forward direction and a reverse direction; temporarily storing a portion of the welding wire in an intermediate wire receptacle disposed along a feeding path between the push-side feeding motor and the pull-side feeding motor; and correcting a pull feeding speed of the pull-side feeding motor based on a store amount of the welding wire in the intermediate wire receptacle. The correcting a pull feeding speed includes correcting a waveform parameter for the pull feeding speed based on the store amount.

Preferably, the waveform parameter may include at least one of a forward-feeding peak value and a reverse-feeding peak value.

Preferably, the waveform parameter may include a forward-feeding peak value when the store amount is larger than a target value, or a reverse-feeding peak value when the store amount is smaller than the target value.

Preferably, the waveform parameter may include a reverse-feeding peak value when the store amount is larger than a target value, or a forward-feeding peak value when the store amount is smaller than the target value.

Preferably, the correcting a pull feeding speed may be performed in synchronization with a predetermined phase of the waveform parameter.

Preferably, the predetermined phase may be a phase at which the pull feeding speed becomes zero.

Preferably, the method may further include: storing the corrected waveform parameter at an end of a welding process; and starting a next welding process with the stored corrected waveform parameter.

According to the above method, the pull feeding speed is corrected based on the amount of a portion of the welding wire stored in the intermediate wire receptacle. Hence, correction control can be performed at high speed and with high accuracy, which contributes to ensuring welding of high quality.

Further features and advantages of the present disclosure will become apparent from the following detailed description with reference to the attached drawings.

DRAWINGS

Figure 2:
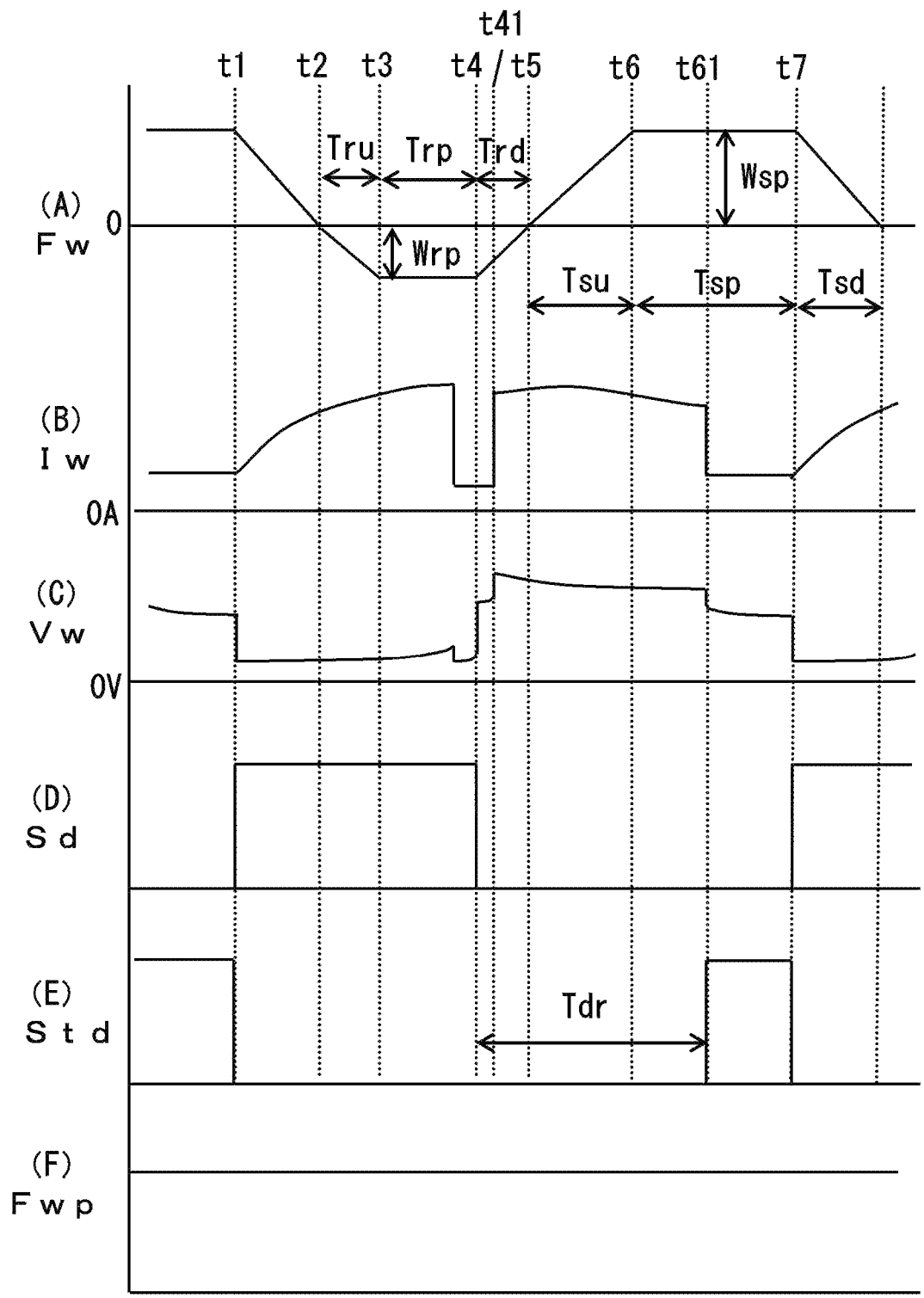
Figure 3:
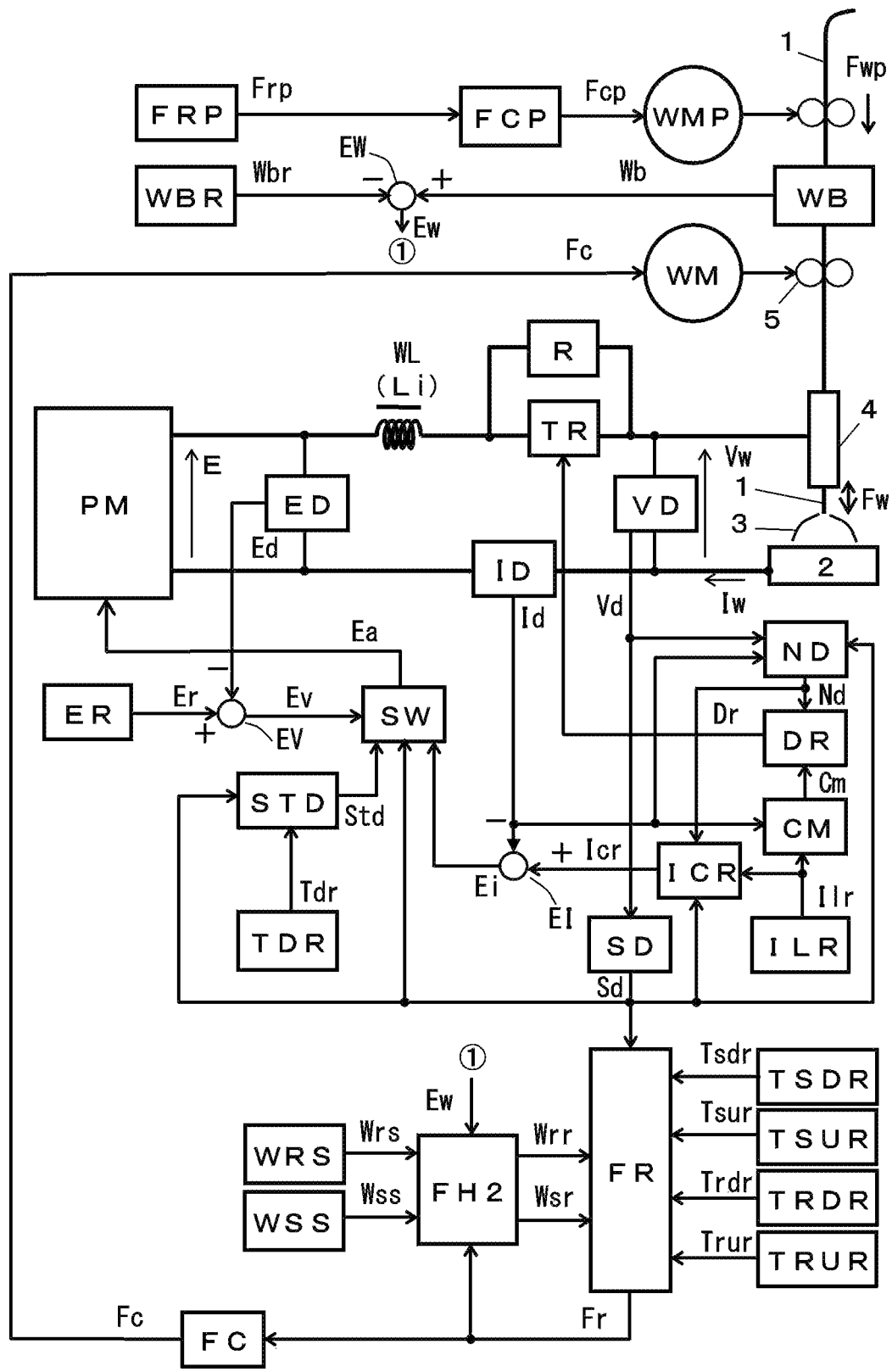
Figure 4:
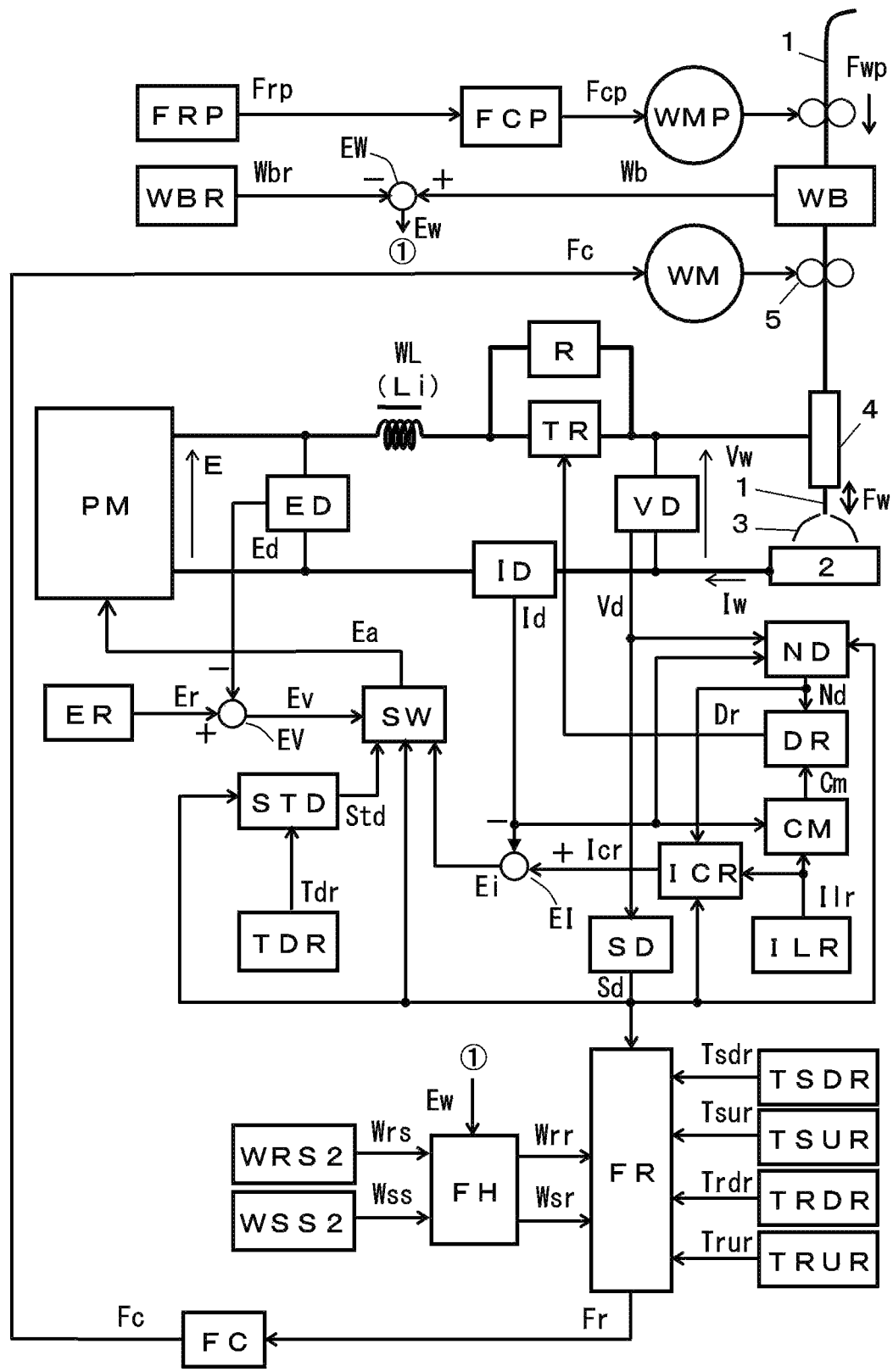

FIG. 1 is a block diagram showing a welding power supply for implementing an arc welding control method according to Embodiment 1 of the present disclosure;

FIG. 2 is a timing chart showing individual signals in the welding power supply of FIG. 1; and FIG. 3 is a block diagram showing a welding power supply for implementing an arc welding control method according to Embodiment 2 of the present disclosure; and FIG. 4 is a block diagram showing a welding power supply for implementing an arc welding control method according to Embodiment 3 of the present disclosure.

EMBODIMENTS

The following describes embodiments of the present disclosure with reference to the accompanying drawings.

Embodiment 1

FIG. 1 is a block diagram showing a welding power supply for implementing an arc welding control method according to Embodiment 1 of the present disclosure. The following describes each of the blocks with reference to FIG. 1.

A power main circuit PM receives a power of three-phase 200 V or the like from a commercial power source (not shown), performs output control such as inverter control according to an error amplification signal Ea (described later), and outputs an output voltage E. Although not shown, the power main circuit PM includes a primary rectifier, a smoothing capacitor, an inverter circuit, a high-frequency transformer, and a secondary rectifier. The primary rectifier rectifies the commercial power source and outputs the rectified current or direct current (DC). The smoothing capacitor smooths the direct current from the primary rectifier. The inverter circuit is driven by the error amplification signal Ea and converts the smoothed DC into a high-frequency AC. The high-frequency transformer lowers the voltage of the high-frequency AC to a value suitable for welding. The secondary rectifier rectifies the lowered high-frequency AC to DC.

A reactor WL smooths the output voltage E. The reactor WL has an inductance of 100 pH, for example.

A push-side feeding motor WMP receives a push feeding control signal Fcp, rotates in a forward direction to feed a welding wire 1 at a push feeding speed Fwp that is a constant speed. A pull-side feeding motor WM receives a pull feeding control signal Fc (described later), and alternately and repeatedly rotates in a forward direction and a reverse direction to feed the welding wire 1 at a feeding speed Fw. The push-side feeding motor WMP is provided on the upstream side of the feeding path, and the pull-side feeding motor WM is provided on the downstream side of the feeding path. Both of the feeding motors are speed-controlled. These feeding motors constitute a push-pull feeding control system.

An intermediate wire receptacle WB is provided along the feeding path between the push-side feeding motor WMP and the pull-side feeding motor WM. The intermediate wire receptacle WB is configured to store a portion of the welding wire 1 temporarily, and outputs a store amount signal Wb in accordance with the amount of the welding wire 1 stored therein. For the intermediate wire receptacle WB, use may be made of the conventional receptacle disclosed in JP-A-2017-94380. The amount of the stored portion of the welding wire 1 (which may be referred to as "wire store amount", or more simply "store amount") is detected mechanically (by mechanical means), electrically (by electrical means), optically (by optical means), magnetically (by magnetic means), or a combination of these means.

The welding wire 1 is fed through a welding torch 4 by the rotation of a feeding roll 5 connected to the pull-side feeding motor WM, and an arc 3 is generated between the welding wire 1 and a base material 2. A welding voltage Vw is applied between a power supply chip (not shown) within the welding torch 4 and the base material 2 to cause a flow of a welding current Iw. A shield gas (not shown) is ejected from the tip of the welding torch 4 to shield the arc 3 from the atmosphere.

An output voltage setting circuit ER outputs a predetermined output voltage setting signal Er. An output voltage detection circuit ED detects the output voltage E and smooths it to output an output voltage detection signal Ed.

A voltage error amplification circuit EV receives the output voltage setting signal Er and the output voltage detection signal Ed, amplifies the error between the output voltage setting signal Er (+) and the output voltage detection signal Ed (−), and outputs a voltage error amplification signal Ev.

A current detection circuit ID detects the welding current Iw and outputs a current detection signal Id. A voltage detection circuit VD detects the welding voltage Vw and outputs a voltage detection signal Vd. A short-circuit determination circuit SD receives the voltage detection signal Vd, and outputs a short-circuit determination signal Sd. Specifically, when the value of the voltage detection signal Vd is less than a predetermined short-circuit determination value (approximately 10 V), the short-circuit determination circuit SD determines that the current period is a short-circuit period, and outputs a short-circuit determination signal Sd of High level. When the value of the voltage detection signal Vd is greater than or equal to the predetermined short-circuit determination value, the short-circuit determination circuit SD determines that the current period is an arc period, and outputs a short-circuit determination signal Sd of Low level.

A forward-feeding acceleration period setting circuit TSUR outputs a predetermined forward-feeding acceleration period setting signal Tsur.

A forward-feeding deceleration period setting circuit TSDR outputs a predetermined forward-feeding deceleration period setting signal Tsdr.

A reverse-feeding acceleration period setting circuit TRUR outputs a predetermined reverse-feeding acceleration period setting signal Trur.

A reverse-feeding deceleration period setting circuit TRDR outputs a predetermined reverse-feeding deceleration period setting signal Trdr.

A forward-feeding peak initial value setting circuit WSS outputs a predetermined forward-feeding peak initial value setting signal Wss.

A reverse-feeding peak initial value setting circuit WRS outputs a predetermined reverse-feeding peak initial value setting signal Wrs.

A store amount setting circuit WBR outputs a predetermined store amount setting signal Wbr indicating a target value. A store amount error amplification circuit EW receives the store amount setting signal Wbr and the store amount signal Wb, amplifies the error between the store amount setting signal Wbr (−) and the store amount signal Wb (+), and outputs a store amount error amplification signal Ew. Letting G be a positive amplification factor, $Ew=G \cdot (Wb-Wbr)$. Accordingly, when the store amount signal Wb is larger than the store amount setting signal Wbr indicating the target value, the store amount error amplification signal Ew has a positive value. On the other hand, when the store amount signal Wb is smaller than the store amount setting signal Wbr indicating the target value, the store amount error amplification signal Ew has a negative value.

A pull feeding speed correction circuit FH receives the forward-feeding peak initial value setting signal Wss, the reverse-feeding peak initial value setting signal Wrs, and the store amount error amplification signal Ew, performs correction control by selecting one of the following processes (1) to (5), and outputs the forward-feeding peak value setting signal Wsr and the reverse-feeding peak value setting signal Wrr. The following correction control (modulation control) may be performed repeatedly at predetermined very short intervals (e.g., 0.1 ms). The following correction control may be performed when the control system operates on proportional control (P control). Alternatively, the same correction control may be performed when the control system operates on proportional integral control (PI control) or proportional integral differential control (PID control), for example.

Process 1: The correction control is performed only on the forward-feeding peak value.

The correction control (modulation control) is performed on the forward-feeding peak initial value setting signal Wss with use of the store amount error amplification signal Ew, and the forward-feeding peak value setting signal Wsr=Wss+Ew is outputted. Then, the reverse-feeding peak initial value setting signal Wrs is outputted as the reverse-feeding peak value setting signal Wrr=Wrs.

Process 2: The correction control is performed only on the reverse-feeding peak value.

The correction control (modulation control) is performed on the reverse-feeding peak initial value setting signal Wrs with use of the store amount error amplification signal Ew, and the reverse-feeding peak value setting signal Wrr=Wrs+Ew is outputted. Then, the forward-feeding peak initial value setting signal Wss is outputted as the forward-feeding peak value setting signal Wsr=Wss.

Process 3: The correction control is performed on both the forward-feeding peak value and the reverse-feeding peak value.

The correction control (modulation control) is performed on the forward-feeding peak initial value setting signal Wss with use of the store amount error amplification signal Ew, and the forward-feeding peak value setting signal Wsr=Wss+Ew is outputted. The correction control (modulation control) is also performed on the reverse-feeding peak initial value setting signal Wrs with use of the store amount error amplification signal Ew, and the reverse-feeding peak value setting signal Wrr=Wrs+Ew is outputted.

Process 4: A first case where the correction control is performed on the forward-feeding peak value and the reverse-feeding peak value according to the sign of the store amount error amplification signal Ew.

When the store amount error amplification signal Ew 0, the correction control (modulation control) is performed on the forward-feeding peak initial value setting signal Wss with use of the store amount error amplification signal Ew, and the forward-feeding peak value setting signal Wsr=Wss+Ew is outputted. On the other hand, when the store amount error amplification signal Ew<0, the correction control (modulation control) is performed on the reverse-feeding peak initial value setting signal Wrs with use of the store amount error amplification signal Ew, and the reverse-feeding peak value setting signal Wrr=Wrs+Ew is outputted.

Process 5: A second case where the correction control is performed on the forward-feeding peak value and the reverse-feeding peak value according to the sign of the store amount error amplification signal Ew.

When the store amount error amplification signal Ew<0, the correction control (modulation control) is performed on the forward-feeding peak initial value setting signal Wss with use of the store amount error amplification signal Ew, and the forward-feeding peak value setting signal Wsr=Wss+Ew is outputted. On the other hand, when the store amount error amplification signal Ew≥0, the correction control (modulation control) is performed on the reverse-feeding peak initial value setting signal Wrs with use of the store amount error amplification signal Ew, and the reverse-feeding peak value setting signal Wrr=Wrs+Ew is outputted.

A pull feeding speed setting circuit FR receives the forward-feeding acceleration period setting signal Tsur, the forward-feeding deceleration period setting signal Tsdr, the reverse-feeding acceleration period setting signal Trur, the reverse-feeding deceleration period setting signal Trdr, the forward-feeding peak value setting signal Wsr, the reverse-feeding peak value setting signal Wrr and the short-circuit determination signal Sd, and outputs a pull feeding speed setting signal Fr that indicates a pull feeding speed pattern generated by the following processes. When the pull feeding speed setting signal Fr indicates zero or larger (Fr≥0), the feeding period is set to the forward feeding period. When the pull feeding speed setting signal Fr indicates a value less than zero (Fr<0), the feeding period is set to a reverse feeding period.

(1) During a forward-feeding acceleration period Tsu determined by the forward-feeding acceleration period setting signal Tsur, the pull feeding speed setting circuit FR outputs the pull feeding speed setting signal Fr that linearly accelerates from zero to a forward-feeding peak value Wsp that is a positive value determined by the forward-feeding peak value setting signal Wsr.

(2) During a forward-feeding peak period Tsp, the pull feeding speed setting circuit FR outputs the pull feeding speed setting signal Fr that maintains the forward-feeding peak value Wsp.

(3) When the short-circuit determination signal Sd changes from Low level (arc period) to High level (short-circuit period), the current period is transitioned to a forward-feeding deceleration period Tsd determined by the forward-feeding deceleration period setting signal Tsdr, and the pull feeding speed setting circuit FR outputs the pull feeding speed setting signal Fr that linearly decelerates from the forward-feeding peak value Wsp to zero.

(4) During a reverse-feeding acceleration period Tru determined by the reverse-feeding acceleration period setting signal Trur, the pull feeding speed setting circuit FR outputs the pull feeding speed setting signal Fr that linearly accelerates from zero to a reverse-feeding peak value Wrp that is a negative value determined by the reverse-feeding peak value setting signal Wrr.

(5) During a reverse-feeding peak period Trp, the pull feeding speed setting circuit FR outputs the pull feeding speed setting signal Fr that maintains the reverse-feeding peak value Wrp.

(6) When the short-circuit determination signal Sd changes from High level (short-circuit period) to Low level (arc period), the current period is transitioned to a reverse-feeding deceleration period Trd determined by the reverse-feeding deceleration period setting signal Trdr, and the pull feeding speed setting circuit FR outputs the pull feeding speed setting signal Fr that linearly decelerates from the reverse-feeding peak value Wrp to zero.

(7) The above processes (1) to (6) are repeated to generate the pull feeding speed setting signal Fr having a feeding pattern that changes in the form of positive and negative trapezoidal waves.

A pull feeding control circuit FC receives the pull feeding speed setting signal Fr, and outputs, to the pull-side feeding motor WM, the pull feeding control signal Fc for feeding the welding wire 1 at the pull feeding speed Fw corresponding to the value indicated by the pull feeding speed setting signal Fr.

A push feeding speed setting circuit FRP outputs a predetermined push feeding speed setting signal Frp that has a positive value. A push feeding control circuit FCP receives the push feeding speed setting signal Frp, and outputs, to the push-side feeding motor WMP, the push feeding control signal Fcp for feeding the welding wire 1 at the push feeding speed Fwp corresponding to the value indicated by the push feeding speed setting signal Frp.

A current limiting resistor R is inserted between the reactor WL and the welding torch 4. The current limiting resistor R is set to a value (approximately 0.5 to 3Ω) at least 50 times larger than a short-circuit load (approximately 0.01 to 0.03Ω). When the current limiting resistor R is inserted in the current path, the energy accumulated in the reactor WL and the reactor of an external cable is rapidly discharged.

A transistor TR is connected in parallel to the current limiting resistor R, and is subjected to ON/OFF control according to a drive signal Dr (described later).

A constriction detection circuit ND receives the short-circuit determination signal Sd, the voltage detection signal Vd, and the current detection signal Id, and outputs a constriction detection signal Nd. When the short-circuit determination signal Sd is at High level (short-circuit period) and the voltage rise value of the voltage detection signal Vd reaches a reference value, the constriction detection circuit ND determines that the forming state of a constriction has reached a predetermined reference state, and outputs the constriction detection signal Nd at High level. When the short-circuit determination signal Sd changes to Low level (arc period), the constriction detection circuit ND outputs the constriction detection signal Nd at Low level. As another example, when the differential value of the voltage detection signal Vd during the short-circuit period reaches the corresponding reference value, the constriction detection signal Nd may be changed to High level. As yet another example, the resistance value of a droplet may be calculated by dividing the value of the voltage detection signal Vd by the value of the current detection signal Id, and when the differential value of the resistance value reaches the corresponding reference value, the constriction detection signal Nd may be changed to High level.

A low-level current setting circuit ILR outputs a predetermined low-level current setting signal Ilr. A current comparison circuit CM receives the low-level current setting signal Ilr and the current detection signal Id, and outputs a current comparison signal Cm. The current comparison signal Cm is at High level when Id<Ilr, and at Low level when Id≥Ilr.

A drive circuit DR receives the current comparison signal Cm and the constriction detection signal Nd, and outputs the drive signal Dr to the base terminal of the transistor TR. The drive signal Dr changes to Low level when the constriction detection signal Nd changes to High level, and then changes to High level when the current comparison signal Cm changes to High level. In this manner, the drive signal Dr is at Low level upon detection of a constriction, thereby causing the transistor TR to be turned off (or placed in OFF state), and thus the current limiting resistor R is inserted in the current path. As a result, the welding current Iw that flows through the short-circuit load rapidly decreases. When the welding current Iw rapidly decreases to the value of the low-level current setting signal Ilr, the drive signal Dr changes to High level and the transistor TR is turned on (placed in ON state). As a result, the current limiting resistor R is short-circuited, and the normal state is restored.

A current control setting circuit ICR receives the short-circuit determination signal Sd, the low-level current setting signal Ilr, and the constriction detection signal Nd, and performs the following processes to output a current control setting signal Icr.

(1) When the short-circuit determination signal Sd is at Low level (arc period), the current control setting circuit ICR outputs the current control setting signal Icr that is the low-level current setting signal Ilr.

(2) When the short-circuit determination signal Sd changes to High level (short-circuit period), the current control setting circuit ICR outputs the current control setting signal Icr that indicates a predetermined initial current setting value during a predetermined initial period. After the initial period, current control setting signal Icr increases from the initial current setting value to a predetermined short-circuit peak setting value with a predetermined short-circuit inclination, and maintains the short-circuit peak setting value.

(3) Thereafter, when the constriction detection signal Nd changes to High level, the current control setting circuit ICR outputs the current control setting signal Icr that indicates the value of the low-level current setting signal Ilr.

A current error amplification circuit EI receives the current control setting signal Icr and the current detection signal Id, amplifies the error between the current control setting signal Icr (+) and the current detection signal Id (−), and outputs a current error amplification signal Ei.

A current drop time setting circuit TDR outputs a predetermined current drop time setting signal Tdr.

A small-current period circuit STD receives the short-circuit determination signal Sd and the current drop time setting signal Tdr, and outputs a small-current period signal Std. The small-current period signal Std is at High level when the time determined by the current drop time setting signal Tdr has elapsed from when the short-circuit determination signal Sd changes to Low level (arc period). Thereafter, when the short-circuit determination signal Sd changes to High level (short-circuit period), the small-current period signal Std changes to Low level.

A power characteristic switching circuit SW receives the current error amplification signal Ei, the voltage error amplification signal Ev, the short-circuit determination signal Sd, and the small-current period signal Std, and performs the following processes to output the error amplification signal Ea.

(1) During the period from when the short-circuit determination signal Sd changes to High level (short-circuit period) to when the short-circuit determination signal Sd changes to Low level (arc period) and a predetermined delay period has elapsed thereafter, the power characteristic switching circuit SW outputs the current error amplification signal Ei as the error amplification signal Ea.

(2) During the subsequent large-current arc period, the power characteristic switching circuit SW outputs the voltage error amplification signal Ev as the error amplification signal Ea.

(3) During a subsequent small-current arc period in which the small-current period signal Std is at High level, the power characteristic switching circuit SW outputs the current error amplification signal Ei as the error amplification signal Ea. The circuit SW causes the welding power supply to have a constant current characteristic during the short-circuit period, the delay period, and the small-current arc period, and to have a constant voltage characteristic during the remaining period other than these periods, i.e., the large current arc period.

FIG. 2 is a timing chart showing individual signals in the welding power supply of FIG. 1. In FIG. 2, (A) shows the temporal change of the pull feeding speed Fw, (B) shows the temporal change of the welding current Iw, (C) shows the temporal change of the welding voltage Vw, (D) shows the temporal change of the short-circuit determination signal Sd, (E) shows the temporal change of the small-current period signal Std, and (F) shows the temporal change of the push feeding speed Fwp.

The pull feeding speed Fw shown in (A) of FIG. 2 is controlled by the pull feeding speed setting signal Fr outputted from the pull feeding speed setting circuit FR in FIG. 1. The pull feeding speed Fw can be divided into several sections that correspond to: the forward-feeding acceleration period Tsu determined by the forward-feeding acceleration period setting signal Tsur; the forward-feeding peak period Tsp that continues until short-circuiting occurs; the forward-feeding deceleration period Tsd determined by the forward-feeding deceleration period setting signal Tsdr; the reverse-feeding acceleration period Tru determined by the reverse-feeding acceleration period setting signal Trur; the reverse-feeding peak period Trp that continues until arcing occurs; and the reverse-feeding deceleration period Trd determined by the reverse-feeding deceleration period setting signal Trdr. The forward-feeding peak value Wsp is determined by the forward-feeding peak value setting signal Wsr, and the reverse-feeding peak value Wrp is determined by the reverse-feeding peak value setting signal Wrr. The pull feeding speed setting signal Fr has a feeding pattern that changes in the form of positive and negative trapezoidal waves. The push feeding speed Fwp shown in (F) of FIG. 2 is a constant speed determined by the push feeding speed setting signal Frp.

<Operations in Short-Circuit Period from t1 to t4>

When short-circuiting occurs at time t1 in the forward-feeding peak period Tsp, the welding voltage Vw rapidly decreases to a short-circuit voltage value of several volts, as shown in (C) of FIG. 2. This causes the short-circuit determination signal Sd to change to High level (short-circuit period), as shown in (D) of FIG. 2. In response, the pull feeding speed Fw enters the predetermined forward-feeding deceleration period Tsd from time t1 to t2, and decelerates from the forward-feeding peak value Wsp to zero, as shown (A) of FIG. 2. For example, the forward-feeding deceleration period Tsd is set to 1 ms (Tsd=1 ms).

As shown in (A) of FIG. 2, the pull feeding speed Fw enters the predetermined reverse-feeding acceleration period Tru from time t2 to t3, and accelerates from zero to the reverse-feeding peak value Wrp. The short-circuit period continues during the reverse-feeding acceleration period Tru. For example, the reverse-feeding acceleration period Tru is set to 1 ms (Tru=1 ms).

When the reverse-feeding acceleration period Tru ends at time t3, the pull feeding speed Fw enters the reverse-feeding peak period Trp and indicates the reverse-feeding peak value Wrp, as shown in (A) of FIG. 2. The reverse-feeding peak period Trp continues until arcing occurs at time t4. Accordingly, the period from time t1 to t4 is a short-circuit period. The reverse-feeding peak period Trp may not be specifically set, but may last approximately 4 ms.

Referring to (B) of FIG. 2, in the period from time t1 to t4, the welding current Iw, which has a predetermined initial current value during a predetermined initial period, may rise with a predetermined short-circuit inclination to reach a predetermined short-circuit peak value, and may maintain (or substantially maintain) the short-circuit peak value.

As shown in (C) of FIG. 2, the welding voltage Vw will begin to rise at or around the point when the welding current Iw reaches the short-circuit peak value. This is because a constriction is gradually formed on a droplet at the tip of the welding wire 1 due to the reverse feeding of the welding wire 1 and the action of a pinch force by the welding current Iw.

Then, when the voltage value of the welding voltage Vw reaches the reference value, determination is made that the constriction being formed has reached the reference state, and accordingly the constriction detection signal Nd of FIG. 1 changes to High level.

In response to the state where the constriction detection signal Nd indicates High level, the drive signal Dr of FIG. 1 indicates Low level. This causes the transistor TR of FIG. 1 to be turned off, and the current limiting resistor R of FIG. 1 is inserted in the current path. At the same time, the value of the current control setting signal Icr of FIG. 1 decreases to the value of the low-level current setting signal Ilr. As a result, the value of the welding current Iw decreases sharply or plummets from the short-circuit peak value to a low-level current value, as shown in (B) of FIG. 2. When the welding current Iw decreases to the low-level current value, the drive signal Dr changes back to High level. This causes the transistor TR to be turned on, and the current limiting resistor R is short-circuited. As shown in (B) of FIG. 2, the welding current Iw maintains the low level current value until a predetermined delay period elapses from the reoccurrence of an arc (t4), since the current control setting signal Icr is still the low-level current setting signal Ilr. Thus, the transistor TR is turned off only during the period from when the constriction detection signal Nd changes to High level to when the welding current Iw decreases to the low level current value. As shown in (C) of FIG. 2, the welding voltage Vw decreases once and then rapidly rises due to the decrease in the welding current Iw. The parameters described above may be set to have the following values. Initial current=40 A, Initial period=0.5 ms, Short-circuit inclination=175 A/ms, Short-circuit peak value=400 A, Low level current value=50A, and Delay period=0.5 ms.

<Operations in Arc Period from t4 to t7>

The reverse feeding of the welding wire and the action of the pinch force by the flow of the welding current Iw cause the constriction to progress and generate an arc at time t4, and accordingly the welding voltage Vw rapidly increases to an arc voltage value of several tens of volts, as shown in (C) of FIG. 2. As a result, the short-circuit determination signal Sd changes to Low level (arc period), as shown in (D) of FIG. 2. In response, the pull feeding speed Fw enters the predetermined reverse-feeding deceleration period Trd from time t4 to t5, and decelerates from the reverse-feeding peak value Wrp to zero, as shown in (A) of FIG. 2. For example, the reverse-feeding acceleration period Trd is set to 1 ms (Trd=1 ms).

When the reverse-feeding deceleration period Trd ends at time t5, the pull feeding speed Fw enters the forward-feeding acceleration period Tsu from time t5 to t6. During the forward-feeding acceleration period Tsu, the pull feeding speed Fw accelerates from zero to the forward-feeding peak value Wsp, as shown in (A) of FIG. 2. The arc period continues during forward-feeding acceleration period Tsu. For example, the forward-feeding acceleration period Tsu is set to 1 ms (Tsu=1 ms).

When the forward-feeding acceleration period Tsu ends at time t6, the pull feeding speed Fw enters the forward-feeding peak period Tsp, and indicates the forward-feeding peak value Wsp, as shown in (A) of FIG. 2. The arc period still continues during the forward-feeding peak period Tsp. The forward-feeding peak period Tsp continues until short-circuiting occurs at time t7. Accordingly, the arc period is the period from time t4 to time t7. Then, when short-circuiting occurs, the same operations as those at time t1 onward will be repeated. The forward-feeding peak period Tsp may not be set in advance but is approximately 4 ms.

When arcing occurs at time t4, the welding voltage Vw rapidly increases to an arc voltage value of several tens of volts, as shown in (C) of FIG. 2. On the other hand, the welding current Iw maintains the low level current value during the delay period from time t4 to t41. After time t41, the welding current Iw rapidly increases to the peak value, and then indicates a large current value that gradually decreases. During the large-current arc period from time t41 to t61, the voltage error amplification signal Ev of FIG. 1 performs feedback control for the welding power supply, so that the welding power supply has a constant voltage characteristic. Accordingly, the value of the welding current Iw during the large-current arc period changes with the arc load.

As shown in (E) of FIG. 2, the small-current period signal Std changes to High level at time t61 when the current drop time determined by the current drop time setting signal Tdr of FIG. 1 elapses from the occurrence of arcing at time t4. In response, the welding power supply is switched to have a constant current characteristic instead of the constant voltage characteristic. As a result, the welding current Iw decreases to the low-level current value, and maintains the value until time t7 at which short-circuiting occurs. Similarly, the welding voltage Vw also decreases as shown in (C) of FIG. 2. The small-current period signal Std changes back to Low level when short-circuiting occurs at time t7.

The forward-feeding peak value Wsp (forward-feeding peak value setting signal Wsr) and/or the reverse-feeding peak value Wrp (reverse-feeding peak value setting signal Wrr) in FIG. 2 are/is corrected and controlled by the pull feeding speed correction circuit FH (FIG. 1) selecting one of the processes (1) to (5).

Numerical examples of the correction control of the pull feeding speed Fw are given below. It is assumed that Wss=60 m/min and Wrs=−50 m/min.

If Ew=2, then:
(process 1) Wsr=60+2=62, and Wrr=−50;
(process 2) Wsr=60, and Wrr=−50+2=−48;
(process 3) Wsr=60+2=62, and Wrr=−50+2=−48;
(process 4) since Ew≥0, Wsr=60+2=62, and Wrr=−50; and
(process 5) since Ew≥0, Wsr=60, and Wrr=−50+2=−48.
If Ew=−3, then:
(process 1) Wsr=60−3=57, and Wrr=−50;
(process 2) Wsr=60, and Wrr=−50−3=−53;
(process 3) Wsr=60−3=57, and Wrr=−50−3=−53;
(process 4) since Ew<0, Wsr=60, and Wrr=−50−3=−53; and
(process 5) since Ew<0, Wsr=60-3=57, and Wrr=−50.

According to Embodiment 1, waveform parameter correction for the pull feeding speed is performed based on the wire store amount in the intermediate wire receptacle. In the present embodiment, the target waveform parameters subjected to the correction may include the forward-feeding peak value and the reverse-feeding peak value, and at least one of them is subjected to correction (or adjustment). Specifically, only the forward-feeding peak value is corrected, or only the reverse-feeding peak value is corrected, or both of the forward-feeding peak value and the reverse-feeding peak value are corrected in the present embodiment.

Generally, in a forward/reverse feeding arc welding method, switching is performed between the forward feeding period and the reverse feeding period in synchronization with timing at which the short-circuit period or the arc period occur. In this configuration, if a welding condition (such as a welding voltage set value and a wire extension length) changes, the time ratio of the short-circuit period to the arc period (and vice versa) will change, and hence the time ratio of the forward feeding period to the reverse feeding period (and vice versa) will also change. Accordingly, the average feeding speed of the welding wire (the average value of the pull feeding speed) changes. However, due to such a change of the average feeding speed, the amount of deposit metal unduly fluctuates, whereby the welding quality deteriorates.

When the average of the pull feeding speed changes depending on the time ratio between the forward feeding period and the reverse feeding period, a difference occurs between the pull feeding speed (which varies) and the push feeding speed (which tends to be constant), which results in an error (difference) between the wire store amount in the intermediate wire receptacle and the preset target value. In the present embodiment, for the purposes of reducing the above-noted error or difference to zero, correction is made to the forward-feeding peak value and/or the reverse-feeding peak value to adjust the average of the pull feeding speed to a desired value, so that the respective averages of the pull feeding speed and the push feeding speed will become equal to each other. Further, in the present embodiment, the waveform parameter of the pull feeding speed is directly corrected. Thus, even if the welding conditions (the welding voltage set value, the wire extension length, etc.) are suddenly changed, excellent transient responsiveness can be enjoyed by the correction control. Also, such a high-speed and high-accuracy correction control method enables high quality welding.

In Embodiment 1, the waveform parameter to be corrected may be the forward-feeding peak value when the store amount is larger than the target value, while it may be the reverse-feeding peak value when the store amount is smaller than the target value. Alternatively, the waveform parameter may be the reverse-feeding peak value when the store amount is larger than the target value, while it may be the forward-feeding peak value when the store amount is smaller than the target value. In this way, the welding state during the correction control can be further stabilized.

Embodiment 2

According to Embodiment 2, the correction control of the pull feeding speed is performed in synchronization with a predetermined phase of the waveform parameter of the pull feeding speed. The predetermined phase is a phase at which the pull feeding speed becomes zero.

FIG. 3 is a block diagram showing a welding power supply for implementing an arc welding control method according to Embodiment 2. In FIG. 3, corresponding to FIG. 1, blocks identical to those in FIG. 1 are provided with the same reference signs, and descriptions thereof are omitted to avoid repetition. As seen from FIG. 3, the pull feeding speed correction circuit FH of FIG. 1 is replaced by a second pull feeding speed correction circuit FH2.

The second pull feeding speed correction circuit FH2 receives the pull feeding speed setting signal Fr, the forward-feeding peak initial value setting signal Wss, the reverse-feeding peak initial value setting signal Wrs, and the store amount error amplification signal Ew. Upon receiving these signals, the second pull feeding speed correction circuit FH2 selects one of the processes (1) to (5) described above with Embodiment 1, and performs correction control based on the store amount error amplification signal Ew at the time that the phase of the pull feeding speed setting signal Fr becomes the predetermined phase. Then, the second pull feeding speed correction circuit FH2 outputs the forward-feeding peak value setting signal Wsr and the reverse-feeding peak value setting signal Wrr.

The timing chart of each signal in FIG. 3 is omitted because the chart is similar to that in FIG. 2, except that the updating of the pull feeding speed Fw by correction control is performed in synchronization with a predetermined phase of the pull feeding speed Fw. Referring to FIG. 2(A), examples of the predetermined phase may be one of the following time points.

(1) Time t1 at which the forward-feeding deceleration period Tsd starts (at the time that short-circuiting occurs).

(2) Time t2 at which forward-feeding is switched to reverse feeding and at which pull feeding speed Fw=0.

(3) Time t3 at which the reverse-feeding peak period Trp starts.

(4) Time t4 at which the reverse-feeding deceleration period Trd starts (at the time that arcing occurs).

(5) Time t5 at which reverse-feeding is switched to forward feeding and at which pull feeding speed Fw=0.

(6) Time t6 at which the forward-feeding peak period Tsp starts.

According to Embodiment 2, the pull feeding speed is corrected in synchronization with the predetermined phase of the wave parameter of the pull feeding speed. In this way, every updating of the pull feeding speed is performed with the same state of welding, which contributes to stabilization of the welding state.

Preferably, the predetermined phase may be a phase at which the pull feeding speed becomes zero. This makes it possible to properly update the pull feeding speed while the pull feeding speed is not undergoing any rapid change. Hence, further stabilization of the welding state can be enjoyed.

Embodiment 3

As noted above with Embodiment 1 or 2, the waveform parameter of the pull feeding speed is subjected to correction. In accordance with Embodiment 3, thus corrected waveform parameter is stored in a memory at the end of the welding. The stored waveform parameter is used for the next welding process, in particular at an initial stage of the welding process, e.g., when the welding is started.

FIG. 4 is a block diagram showing a welding power supply for implementing an arc welding control method according to Embodiment 3 of the present disclosure. FIG. 4 corresponds to FIG. 1. In FIG. 4, blocks identical to those in FIG. 1 are provided with the same reference signs, and descriptions thereof are omitted to avoid repetition. In FIG. 4, the forward-feeding peak initial value setting circuit WSS of FIG. 1 is replaced by a second forward-feeding peak initial value setting circuit WSS2, and the reverse-feeding peak initial value setting circuit WRS of FIG. 1 is replaced by a second reverse-feeding peak initial value setting circuit WRS2.

The second forward-feeding peak initial value setting circuit WSS2 receives the forward-feeding peak value setting signal Wsr, stores the value of the forward-feeding peak value setting signal Wsr present at the end of the previous welding, and outputs the stored value at the start of the next welding as the forward-feeding peak initial value setting signal Wss.

The second reverse-feeding peak initial value setting circuit WRS2 receives the reverse-feeding peak value setting signal Wrr, stores the value of the reverse-feeding peak value setting signal Wrr present at the end of the previous welding, and outputs the stored value at the start of the next welding as the reverse-feeding peak initial value setting signal Wrs.

The timing chart of each signal in FIG. 4 is omitted because the chart is similar to that in FIG. 2, except that the waveform parameter of the pull feeding speed Fw, which has been corrected and controlled, is stored at the end of the previous welding, and the waveform parameter of the pull feeding speed thus stored is used as an initial value at the next welding to start correction control.

According to Embodiment 3, the corrected waveform parameter of the pull feeding speed is stored at the end of welding, and the next welding is started with the stored waveform parameter. This makes it possible to stabilize the welding state from the start of the next welding onward.

As seen from the above, Embodiment 3 can be carried out based on Embodiment 1, but may also be carried out on Embodiment 2 instead.

The invention claimed is:

1. A control method for arc welding performed by repeating a short-circuit period and an arc period, the method comprising:
feeding a welding wire by a push-pull feeding control using a push-side feeding motor configured to rotate in a forward direction and a pull-side feeding motor configured to rotate in a forward direction and a reverse direction;
temporarily storing a portion of the welding wire in an intermediate wire receptacle disposed along a feeding path between the push-side feeding motor and the pull-side feeding motor; and
correcting a pull feeding speed of the pull-side feeding motor based on a store amount of the welding wire in the intermediate wire receptacle,
wherein the pull feeding speed is controlled by a pull feeding speed setting signal outputted by a pull feeding speed setting circuit based on input of a plurality of waveform parameters,
the pull feeding speed setting circuit is configured to receive a short-circuit determination signal indicative of the short-circuit period and the arc period, and
correcting the pull feeding speed comprises: inputting at least one of the plurality of waveform parameters into a pull feeding speed correction circuit; inputting a store amount error amplification signal corresponding to the store amount into the pull feeding speed correction circuit; correcting the at least one of the plurality of waveform parameters based on the store amount; outputting the corrected at least one of the plurality of waveform parameters from the pull feeding speed correction circuit; and inputting the corrected at least one of the plurality of waveform parameters to the pull feeding speed setting circuit.

2. The method according to claim 1, wherein the at least one of the plurality of waveform parameters comprises at least one of a forward-feeding peak value and a reverse-feeding peak value.

3. The method according to claim 1, wherein the at least one of the plurality of waveform parameters comprises a forward-feeding peak value when the store amount is larger than a target value, or a reverse-feeding peak value when the store amount is smaller than the target value.

4. The method according to claim 1, wherein the at least one of the plurality of waveform parameters comprises a reverse-feeding peak value when the store amount is larger than a target value, or a forward-feeding peak value when the store amount is smaller than the target value.

5. The method according to claim 1, wherein correcting the pull feeding speed is performed in synchronization with a predetermined phase of the at least one of the plurality of waveform parameters.

6. The method according to claim 5, wherein the predetermined phase is a phase at which the pull feeding speed becomes zero.

7. The method according to claim 1, further comprising:
   storing the corrected at least one of the plurality of waveform parameters at an end of a welding process; and
   starting a next welding process with the stored corrected at least one of the plurality of waveform parameters.

8. The method according to claim 1, wherein the pull feeding speed setting signal outputted by the pull feeding speed setting circuit is received by a pull feeding control circuit.

9. The method according to claim 8, wherein the pull feeding control circuit is configured to output a pull feeding control signal to the pull-side feeding motor for feeding the welding wire.

10. The method according to claim 1, wherein a store amount error amplification circuit is configured to receive a store amount setting signal and a store amount signal indicative of the store amount, amplify an error between the store amount setting signal and the store amount signal, and output the store amount error amplification signal into the pull feeding speed correction circuit.

* * * * *